United States Patent

[11] 3,549,172

| [72] | Inventors | Billy Joe McBroom<br>4445 Upland;<br>Charles M. Garrett, Jr., 4825 La Perla Way, La Mesa, Calif. 92041 |
|---|---|---|
| [21] | Appl. No. | 794,492 |
| [22] | Filed | Jan. 28, 1969 |
| [45] | Patented | Dec. 22, 1970 |

[54] SEATING AND BACKREST COMBINATION FOR A MULTICYCLE VEHICLE
4 Claims, 11 Drawing Figs.

| [52] | U.S. Cl. | 280/202, 297/243 |
|---|---|---|
| [51] | Int. Cl. | B62j 1/14 |
| [50] | Field of Search | 282/202, 289; 297/243, 195, 350, 352, 232 |

[56] References Cited
UNITED STATES PATENTS

| 1,045,220 | 11/1912 | Turner | 297/243X |
|---|---|---|---|
| 1,074,438 | 9/1913 | Kimpel | 297/243 |
| 1,102,899 | 7/1914 | Fox | 297/243X |
| 1,216,029 | 2/1917 | Whitaker | 297/243 |
| 1,387,083 | 8/1921 | Welch | 297/243X |
| 1,592,651 | 7/1926 | Berry | 280/202 |

*Primary Examiner*—Kenneth H. Betts
*Attorney*—Warren H. F. Schmieding

ABSTRACT: A seating and backrest combination for a multicycle vehicle including three sections hingedly connected longitudinally of one another. One of the sections forms a permanet driver's seat. The other two sections can be moved to positions in which one forms a backrest for the driver or in which the one which formed the backrest can form a seat for a second occupant and the other of the two forms a backrest for the second occupant.

PATENTED DEC 22 1970 3,549,172

INVENTORS
BILLY JOE McBROOM
CHARLES M. GARRETT Jr.
BY
*Warren H. F. Schmieding*
ATTORNEY

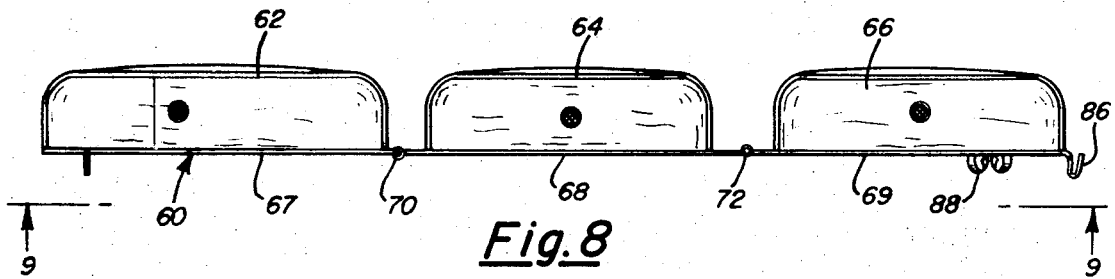
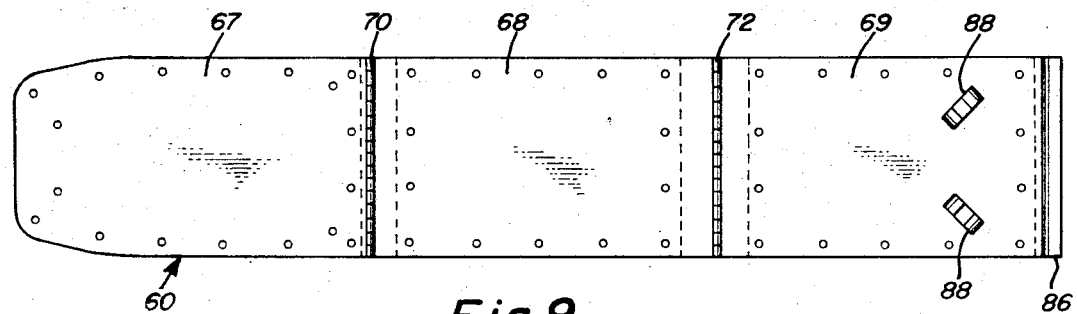
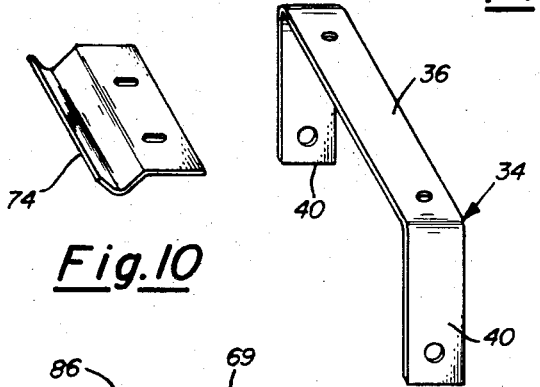
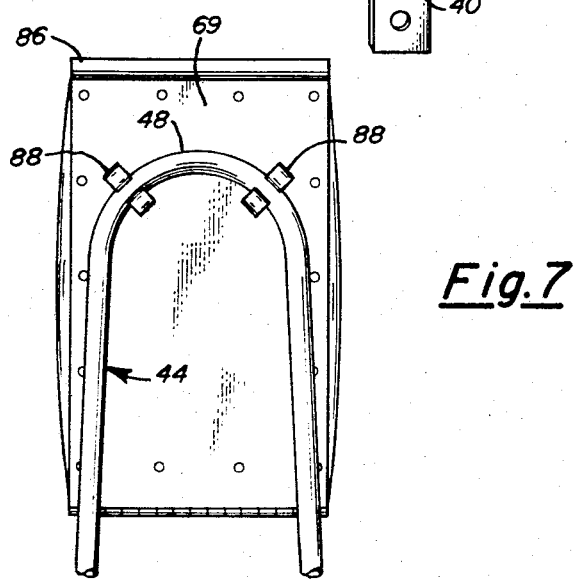

3,549,172

SEATING AND BACKREST COMBINATION FOR A MULTICYCLE VEHICLE

BACKGROUND OF THE INVENTION

1. Field of the Invention

The field includes bicycle and motorcycle seat arrangement found in Class 297, Sub-class 243, among which are U.S. Pat. No. 1,074,438 issued Sept. 30, 1913, to Kimpel and U.S. Pat. No. 1,216,029 issued Feb. 13, 1917 to Whitaker.

2. Description of the Prior Art

While the patent to Kimpel shows a backrest for the driver which can be lowered to form a seat for the second occupant, it does not include a backrest for the second occupant.

Whitaker's backrest-seat 35 and backrest 21 are separate elements, requiring separate supporting arms and pivots therefor. The arm 14 carrying the backrest 21 must be fastened in a different manner to arm 27 when it functions as a backrest than when it functions as a rear brace for the arm 27. The mechanism of Whitaker is difficult to manipulate, costly to manufacture.

SUMMARY OF THE INVENTION

The seating and backrest combination includes three longitudinally and hingedly connected sections. The front section is removable connected to the cycle frame and forms the seat for the driver. The next rearwardly extending section can be positioned to form a backrest for the driver which is braced by the rearmost section, or that section next to the driver's seat can be positioned horizontally so that it functions as a seat for a second occupant and the rearmost section then functions as a backrest for the second occupant.

Other features and the advantages of the present invention will be apparent from the following description, reference being had to the accompanying drawings wherein a preferred embodiment of the invention is illustrated.

BRIEF DESCRIPTION OF THE DRAWINGS 1 is a fragmentary perspective view of the rear end of a motorcycle showing the present invention applied thereto and showing the same in a position in which the intermediate section functions as a backrest for the driver and the rearmost section functions as a brace for the backrest;

FIG. 7 is a rear view looking in the direction of arrows 7—7 of FIG. 2, but on a larger scale;

FIG. 8 is a side view of the three sections forming the seating and backrest combination;

FIG. 9 is a bottom view of the three sections shown in FIG. 8, looking in the direction of arrows 9—9 in FIG. 8;

FIG. 10 is a perspective view of the clip that is employed to maintain the front end of the driver's seat section in position; and FIG. 11 is a perspective view of the driver's seat supporting frame, which frame is connected to the shock absorbers; a like frame is employed for retaining the rearmost seat section in position for bracing the intermediate section in driving seat backrest position.

DESCRIPTION OF THE PREFERRED EMBODIMENT

Figure 6:
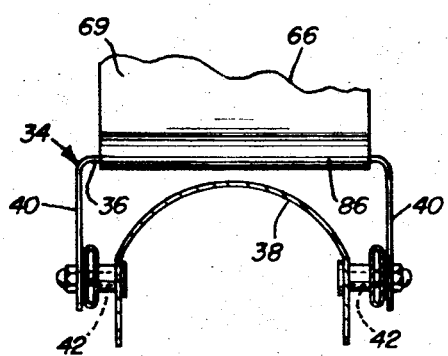
FIG. 5 and FIG. 6 are fragmentary sectional views taken, respectively, along lines 5—5 and 6—6 of FIG. 1, but on larger scales.

Referring more in detail to the drawings, the rear of a motorcycle is shown at 20. The motorcycle includes the usual front wheel and steering fork which are not shown. The rear wheel 22, together with the fork support the main frame 23. The main frame includes the lower horizontally extending portions 24 which are suitably connected with the axle of the rear wheel, two oppositely disposed braces 26 and 28 having their lower ends welded to portions 24, and two oppositely disposed horizontally extending portions 30 and 32 which are suitably fixed to the braces 26 and 28, respectively, as by welding.

The rear ends of the portions 30 and 32 carry an inverted U-shaped stop 34, which includes a horizontally extending yoke 36 spanning the rear fender 38 and two downwardly extending arms 40 which are disposed on opposite sides of the fender 38 and are pivoted to the rear ends of frame portions 30 and 32 by bolts 42. A support 44 has two horizontally extending legs 46 having their front ends fixed to the rear ends of the upper frame portions 30 and 32. These legs merge into a vertically extending hairpin-type rear support 48. The support 48 is braced by two braces 50 connected with the said support and the rear fender 38.

The front ends of the upper frame portions 30 and 32 are connected with a frame portion 52, which latter has fixed thereto two rearwardly extending supports 54 for a pivot pin 56 which carries a rearwardly extending frame 58.

The seating and backrest combination 60 includes three cushioned sections, namely front section 62, intermediate section 64 and rear section 66. Each section is provided with a lower metal base plate. The rear end of base 67 of the front section 62 is pivotally connected through a piano-type hinge by a pin 70 with front end of the base plate 68 for the intermediate section 64, and the rear end of the base plate 68 for the intermediate section 64 is pivotally connected likewise by a pin 72 with the front end of the base plate.

Figure 4:
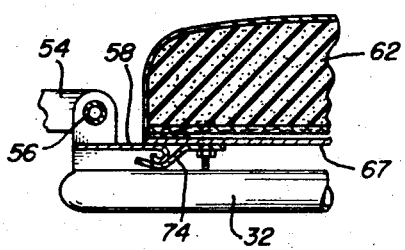
FIG. 4 is a fragmentary sectional view taken along line 4—4 of FIG. 3.
Figure 3:
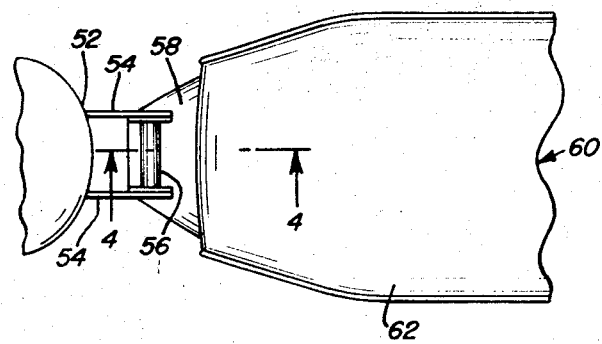
FIG. 3 is a fragmentary plan view looking in the direction of arrows 3—3 of FIG. 1, but on a larger scale.
Figure 5:
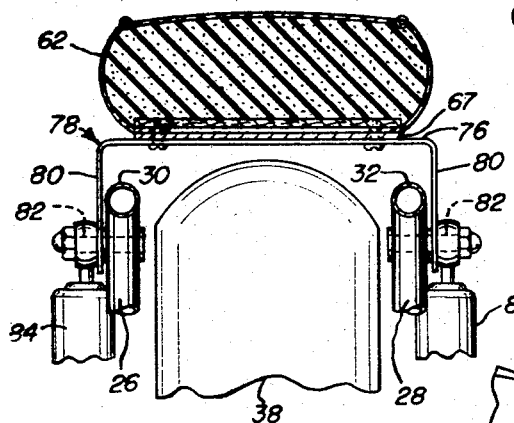

As seen in FIG. 4, the underside of the front end of base plate 67 of front section 62 carries a clip 74 which is received by the rear end of the pivotally carried frame 58. The front end of seat section 62 is clamped between frame 58 and clip 74 by nuts and studs on 67. The underside of the rear of seat section 62 is fixed to the yoke 76 of an inverted U-shaped frame 78. The downwardly extending arms 80 of frame 78 are disposed on opposite sides of the main vehicle frame and are pivotally connected by pins 82 to the upper ends of the shock absorbers 84. The lower ends of the shock absorbers are pivotally connected to the rear wheels. Thus the front section 62 forms a driver's seat which is cushioned by the shock absorbers.

Figure 1:
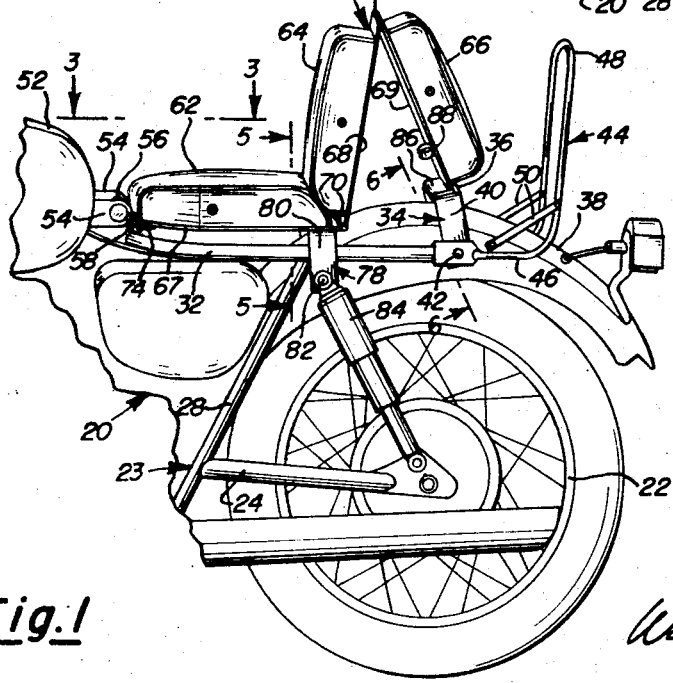

The rear end of the base plate 69 of rear section 66 is in the form of a hook-shaped stop 86, which, as shown in FIG. 1, is adapted to engage the stop portion or yoke 36 of stop 34, whereby the sections are removably held in the position shown in FIG. 1. In this position, the intermediate section 64 extends vertically and rearwardly of the driver's seat section 62, and thereby forms a backrest for the driver. The upper end of the rear section 66, being pivotally connected with the upper end of the intermediate section 64 and having its lower end restricted in rearward movement by the stops 86 and 34, forms a brace for the intermediate section 64, since binding relationship is formed between the pivotally mounted stop 34 and the top of the rear fender 38.

Figure 2:
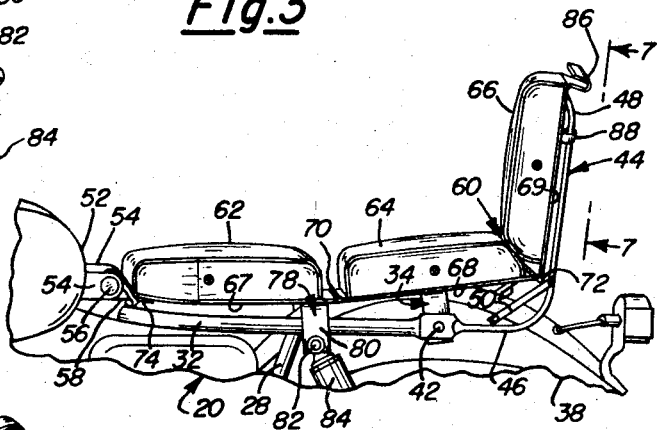
FIG. 2 is a fragmentary perspective view showing the sections in the position in which the intermediate section functions as a seat for a second occupant and the rearmost section functions as a backrest for the second occupant.

When a second occupant is to ride, the hook-shaped stop 86 is pulled forwardly to disengage it from the stop 34. Then the sections 64 and 66 are moved to the position shown in FIG. 2, in which position the intermediate section functions as a seat for the second occupant and the rearmost section rests against the hairpin-shaped support 48 and forms a backrest for the second occupant. Resilient clips 88 are fixed to the underside of base plate 68 of the intermediate section 64. These clips frictionally receive the legs of the hairpin-shaped support 48 to thereby retain the rearmost section in backrest position.

Thus, by virtue of the present invention, there has been provided a seating and backrest combination which is simple in construction, less expensive to manufacture, easy to manipulate and can be readily substituted for the driver's seat of various types of motorcycles now on the market.

We claim:

1. A seating and backrest combination for a multicycle vehicle, comprising in combination with:
   A. the main frame of the vehicle;
   B. a driver's seat supported by the frame;
   C. a stop carried by the frame rearwardly of the driver's seat;
   D. an upright support carried by the frame rearwardly of the stop;
   E. means movable to a vertically extending position, in which position it functions as a backrest for the driver, and movable to a horizontally extending position, in which latter position it functions as a seat disposed rearwardly of the driver's seat;
   F. hinge means pivotally connecting one end of the first mentioned means rearwardly of the driver's seat;
   G. means movable to a vertically extending position, in which position it lies forwardly of and against the upright position to form a backrest, and movable to a horizontally extending position, in which latter position it functions as a seat disposed rearwardly of the driver's seat;
   H. hinge means pivotally connecting the front of the last mentioned means (G) to the opposite end of the first mentioned means (E);
   I. a stop on the rear of the last mentioned means (G) engageable with the stop on the frame for retaining said last mentioned means in a vertically extending position.

2. A seating and backrest combination as defined in claim 1, characterized in that front of the third mentioned means (G) is hinged to the rear of the driver's seat.

3. A seating and backrest combination as defined in claim 1, characterized in that the first and third mentioned means are in the form of cushions.

4. A seating and backrest combination as defined in claim 2, characterized in that the driver's seat and the first and third mentioned means are in the form of a unit, and further characterized to include:
   J. means for removably connecting the driver's seat to the frame.